US008121727B2

(12) United States Patent
Mosey

(10) Patent No.: US 8,121,727 B2
(45) Date of Patent: Feb. 21, 2012

(54) ARTICLE VENDING MACHINE

(76) Inventor: Thomas R. Mosey, Hillsboro Beach, FL (US)

( * ) Notice: Subject to any disclaimer, the term of this patent is extended or adjusted under 35 U.S.C. 154(b) by 421 days.

(21) Appl. No.: 12/260,417

(22) Filed: Oct. 29, 2008

(65) Prior Publication Data

US 2010/0102078 A1 Apr. 29, 2010

(51) Int. Cl.
*G07F 11/00* (2006.01)
*G07F 17/00* (2006.01)
*B65G 59/00* (2006.01)

(52) U.S. Cl. .................... 700/243; 221/131; 221/150 R; 221/210; 221/133; 221/88; 221/211

(58) Field of Classification Search .............. 221/150 R, 221/87-88, 92, 123, 133, 210-212, 220, 221/131, 124, 115; 700/243
See application file for complete search history.

(56) References Cited

U.S. PATENT DOCUMENTS 5,240,139 A * 8/1993 Chirnomas ....................... 221/2
5,971,205 A * 10/1999 Michaels et al. .............. 221/135
6,131,399 A * 10/2000 Hall ................................ 62/127
6,898,942 B2 * 5/2005 Schanin .......................... 62/158
7,063,232 B2 * 6/2006 Chirnomas ...................... 221/92
7,159,410 B2 * 1/2007 Chirnomas ...................... 62/250
7,191,612 B2 * 3/2007 Chirnomas ...................... 62/250
7,228,989 B2 * 6/2007 Bhatti et al. .............. 221/150 R
7,497,353 B2 * 3/2009 Chirnomas ............... 221/150 R
2007/0108220 A1 * 5/2007 Chirnomas ...................... 221/92

* cited by examiner

*Primary Examiner* — Michael K Collins
(74) *Attorney, Agent, or Firm* — Robert G. Oake, Jr.

(57) ABSTRACT

The invention is an article vending machine comprising a plurality of article storage compartments covered by displaceable thermal barriers that are opened by an opener. The invention further comprises a cooling unit, an article extractor for extracting selected articles from the storage compartments, and a control center. Each article storage compartment has a displaceable thermal barrier that is opened and closed by an opener. Each displaceable thermal barrier is capable of being opened and closed independently of all other displaceable thermal barriers. During the vending cycle, only the displaceable thermal barrier covering the storage compartment accessed by the article extractor is opened, which prevents ambient air from mixing with cooled air in storage compartments not accessed by the article extractor. If a displaceable thermal barrier cannot be opened because it has frozen shut or the opener has broken, the remaining displaceable thermal barriers with functioning openers still can be opened.

19 Claims, 6 Drawing Sheets

ARTICLE VENDING MACHINE

FIELD OF THE INVENTION

The present invention relates to an article vending apparatus for dispensing an article selected and removed by an article extractor from one of a plurality of article storage compartments, with each article storage compartment having a displaceable thermal barrier that can be opened and closed independently of the other displaceable thermal barriers.

BACKGROUND OF THE INVENTION

Vending machines are a popular way to market and sell consumable items. Vending machines use various mechanisms and moving parts, such as gears, levers, ratchets, motors, and solenoids to properly vend the selected item. Certain consumable items, such as ice cream, must be stored in the vending machine in a certain temperature range to maintain the desired characteristics of the consumable item. When the mechanisms and moving parts of the vending machine are exposed to temperatures required to maintain certain consumable items such as ice cream in their desired state, mechanical failure is more likely.

One known way to decrease such mechanical failure is to store the consumable product in a cooled article storage compartment that is separated from the remainder of the vending machine cabinet by a thermal barrier. The thermal barrier can be opened when the article is selected and removed from the storage compartment and then closed when the vending cycle is completed. An example of such an apparatus is disclosed in U.S. Pat. No. 5,240,139 ("the '139 patent) to Chirnomas. The apparatus disclosed by Chirnomas contains a freezer storage compartment with a thermal barrier for maintaining a frozen environment in isolation of the ambient temperature air filling the remaining interior space of the vending machine. The apparatus disclosed by the '139 patent to Chirnomas further contains a mechanism for opening and closing the thermal barrier, a vacuum picker for removing a selected article from the storage freezer compartment, and a controller for controlling the vacuum picker and the opening and closing mechanism. The vacuum picker is located outside the freezer compartment in between operating cycles and enters the freezer compartment only when removing an article to be dispensed.

The apparatus disclosed by the '139 patent to Chirnomas prevents the moving mechanisms from being constantly exposed to freezing temperatures inside the vending machine. However, the apparatus disclosed by Chirnomas creates another problem. During normal machine operation, the thermal barrier is opened and closed many times, which exposes the cooled article storage compartment and the articles being stored in the cooled article storage compartment to the ambient air. Such exposure to ambient air is undesirable because over time it can degrade the quality of the frozen articles. This is particularly true when the stored articles include cryogenically frozen and free flowing particles of ice cream, which can sinter, or stick together, when ambient air is repeatedly introduced into the cooled article storage compartment by the thermal barrier being opened during normal operation. Methods of manufacture of such cryogenically frozen and free flowing particles of ice cream are described, for example, in U.S. Pat. No. 6,349,549 ("the '549 patent) to Angus, et al. and U.S. Pat. No. 5,126,156 ("the '156 patent) to Jones. Since one of the highly desirable characteristics of the frozen ice cream particles is their free flowing character, it is important that the particles are kept in a free flowing state before they are purchased by the consumer in a vending environment. An additional problem with moist ambient air being introduced into the cooled storage chamber is that moist air tends to form frost that can build up on the internal walls of the storage compartment and reduce the internal size of the storage compartment and adversely affect the positioning of the stored articles and the thermal and operational efficiency of the cooling units.

The above described problems of moist ambient air entering a cooled storage compartment in a vending machine and adversely affecting the stored article and cooling chamber are discussed in U.S. Pat. No. 7,118,009 ("the '009 patent) to Chirnomas. The solution disclosed in the '009 patent to Chirnomas is a storage compartment that is divided into a plurality of sub-compartments, each of which has a displaceable flap that covers the dispensing end of the sub-compartment. Each displaceable flap operates individually with respect to each sub-compartment, thereby allowing articles in the sub-compartments to pass therethrough during the dispensing operation.

The plurality of individual flaps disclosed in the '009 patent to Chirnomas creates additional problems. First, when the storage compartments are cooled to very cold temperatures, for example −40 degrees Centigrade to store frozen free flowing ice cream beads, the flaps are exposed to very cold temperatures on a relative constant basis. These very cold storage temperatures have a tendency to adversely affect the flexibility and operability of the individual flaps. The individual flaps must remain flexible enough so that the suction force holding the article to the picker head is not overcome. When the very cold storage temperatures create enough rigidity in the flaps such that the suction force holding the article to the picker head is overcome, the vacuum picker is unable to remove the article from the storage cabinet. If the flexible flaps become brittle and break or otherwise degrade over time as they are exposed to cold temperatures, their ability to serve as an effective thermal barrier is compromised or eliminated. An additional problem is that the plurality of individual flexible flaps in the vending machine adds a multitude of additional moving pieces that are potentially prone to failure. The failure rate of the additional moving pieces is increased due to exposure to the frozen environment. The reintroduction of moving parts into the frozen environment recreates the very problem that U.S. Pat. No. 5,240,139 to Chirnomas sought to eliminate (separating the moving parts from the frozen environment).

U.S. Pat. No. 6,481,226 (the '226 patent) to Jones discloses a vending machine for serving extremely cold frozen product such as frozen and free flowing ice cream beads and pieces. The problem sought to be solved by the '226 patent is how to maintain temperatures cold enough in a vending machine storage cabinet to preserve the free flowing nature and integrity of frozen and free flowing ice cream product. The '226 patent discloses an invention directed toward modifying a vending machine to store product at a temperature no greater than −40 degrees Celsius by replacing the compressor with a compressor having higher compression, replacing existing refrigerant with a more efficient refrigerant, increasing the length of the capillary tube, and providing a thermostat capable of achieving a −40 Celsius set point. The disclosed preferred embodiment includes a safety switch that is operable to disable the vending machine from dispensing product if the temperature exceeds the set point. The '226 patent further discloses a freezer chest with a single lid that overlies the top of the freezer chest and that is hinged along one edge for movement between the open and closed positions. The single lid remains closed to maintain the temperature within the freezer chest to its coldest possible temperature until the vending machine is in active operation. When a user selects an article for dispensing, the single lid overlying the freezer chest is opened by a motor so that the motorized serving arm may retrieve ice cream product from within the freezer chest.

U.S. Patent Application Publication 2005/0211720 ("the '720 patent application") to Chirnomas discloses a method and apparatus for storing articles for use with an article handling device. FIG. 5 and FIG. 9 of the '720 patent application illustrate a multiple storage area arrangement where a single vacuum picker serves adjacent storage areas. FIG. 5 illustrates that each storage area has a door. However, the '720 patent application does not disclose how the illustrated doors open (whether hinged, slidable, foldable, etc.) and whether the doors are capable of opening independently from one another. The '720 Published patent application also does not disclose any control mechanism that controls the opening and closing of the doors in relation to the location or operation of the article vacuum picker. The '720 patent app. discloses that the multiple storage areas may be maintained at different temperatures whereby one storage area may have an ambient temperature and the other storage areas may be cooled to a refrigerated temperature or freezing temperature. FIG. 5 and FIG. 9 of the '720 patent app. illustrate and disclose a single cooling unit.

The above described prior art discloses vending machine apparatus and methods capable of storing, selecting, and dispensing articles, including frozen and free flowing pieces of ice cream. However, the above-described prior art apparatus and methods still suffer from a number of problems. One problem is how to effectively prevent ambient and moist air from mixing with the cooled and dry air existing in the cooled storage compartments. The '139 patent to Chirnomas discloses thermal separating means being operative to prevent heat transfer between the cooled storage compartments and the remainder of the interior of the outer cabinet's interior. The thermal separating structure disclosed by the '139 patent consists of (1) sliding panels positioned in sliding door tracks (FIG. 3 in the '139 patent), (2) a multi-part cover constructed with numerous panel members that slide over or under adjacent members (FIG. 11 in the '139 patent), (3) a plurality of hinged members that fold up against one another (FIG. 12 in the '139 patent), (4) a single unit that is connected by at least one hinge to the freezer compartment and that opens in a vertically arcing motion (FIG. 13 in the '139 patent), and (5) a single flexible member that slides in a track (FIG. 14 in the '139 patent). Each of these disclosed structures suffers from the problem of allowing ambient air to mix with the air in the cooled storage compartments when the thermal barrier is displaced during normal vending operation. For example, the single unit that is connected by at least one hinge exposes all the cooled storage compartments to ambient air when it is opened in a vertically arcing motion. The remaining structures that displace by sliding or folding also may expose all the cooled storage compartments to ambient air during normal vending operation. For example, the sliding panels positioned in the sliding door tracks in FIG. 3 of the '139 patent must expose all the cooled storage compartments to ambient air when sliding to open the cooled storage department disposed closest to the vertical rise in the sliding door track. Each of the other sliding or folding structures disclosed in the '139 patent also suffers from this problem.

The '226 patent to Jones discloses a freezer chest with a single lid that overlies the top of the freezer chest and that is hinged along one edge for movement between the open and closed positions. This single lid suffers from the same problems as the single unit that opens in a vertically arcing motion in the '139 patent in that all the cooled storage compartments are exposed to ambient air when the single lid disclosed in the '226 patent is opened.

The '720 Published patent application to Chirnomas discloses a multiple storage area arrangement where each storage area has a door. However, as previously stated the '720 Published patent application does not disclose how the illustrated doors open (whether hinged, slidable, foldable, etc.), whether the doors are capable of opening independently from one another, and does not disclose any control mechanism that controls the opening and closing of the doors in relation to the location or operation of the article vacuum picker.

The '009 patent to Chirnomas discloses a plurality of individual flexible flaps designed to keep the ambient air from mixing with the individual storage compartments during the vending cycle. However, as discussed above, when the flexible flaps become brittle and break or otherwise degrade over time as they are exposed to cold temperatures, their ability to serve as an effective thermal barrier is compromised or eliminated. Further, the plurality of individual flexible flaps in the vending machine adds a multitude of additional moving pieces that are potentially prone to failure, particularly due to their exposure to the frozen environment.

A second problem is that a cooling unit in a vending machine may fail, thereby potentially resulting in spoilage to refrigerated and frozen articles being stored in the storage department. The '226 patent to Jones discussed previously discloses a vending machine that includes a safety switch that is operable to disable the vending machine from dispensing product if the temperature exceeds the set point. However, the '226 patent discloses a freezer chest with only a single lid that overlies the top of the freezer chest and that is hinged along one edge for movement between the open and closed positions. If the temperature exceeds the set point, the entire vending machine is disabled.

A third problem is that the displaceable thermal barrier may not open as a result of a failure of the opening mechanism, the displaceable thermal barrier becoming frozen shut due to a build up of ice, or due to some other failure. The vending machine disclosed in the '139 patent to Chirnomas becomes incapable of vending product if the thermal separating barrier is broken, frozen shut, or is otherwise disabled. The vending machine disclosed in the '139 patent to Chirnomas also is incapable of vending product if the opening mechanism is broken or otherwise disabled.

In light of the aforementioned problems existing in the prior art, there is a need for a more effective thermal barrier that results in less ambient air entering the cooled storage compartments during the vending cycle and that exposes less of the stored articles in the cooled storage compartments to ambient air during a vending cycle. There also is a need for a vending machine that can vend cooled and frozen stored articles when a displaceable thermal barrier opening mechanism breaks or fails or when a displaceable thermal barrier cannot otherwise be opened. There also is a need for a vending machine that can vend cooled and frozen stored articles when a cooling unit fails.

What is further needed is a vending machine with a control mechanism capable of recognizing when a displaceable thermal barrier cannot be opened, that can inform and warn the user that articles located in such storage compartments are unavailable for purchase but that other articles stored in other cooled storage compartments are still available for purchase, and that can direct the article extractor to select articles from storage compartments whose displaceable thermal barriers can be opened.

What is further needed is a vending machine with a control mechanism capable of recognizing when a cooling unit has failed, that can inform and warn the user that articles located in storage compartments with failed cooling units are unavailable for purchase but that other articles stored in other cooled storage compartments with properly functioning cooling units are still available for purchase, and that can direct the article extractor to select articles from storage compartments whose cooling units are functioning properly.

SUMMARY OF THE INVENTION

The invention is an article vending machine comprising a plurality of article storage compartments covered by displaceable thermal barriers that are opened by an opener. The invention further comprises a cooling unit, an article extractor for extracting selected articles from the storage compartments, and a control center. Each article storage compartment has a displaceable thermal barrier that is opened and closed by an opener. Each displaceable thermal barrier is capable of being opened and closed independently of all other displaceable thermal barriers. During the vending cycle, only the displaceable thermal barrier covering the storage compartment accessed by the article extractor is opened, which prevents ambient air from mixing with cooled air in storage compartments not accessed by the article extractor. If a displaceable thermal barrier cannot be opened because it has frozen shut or the opener has broken or otherwise become disabled, the remaining displaceable thermal barriers with functioning openers still can be opened. In a preferred embodiment of the invention, each storage compartment is cooled by an independent cooling unit so that if one cooling unit fails, the remaining cooling unit or units remain functional to cool other storage compartments to within preset temperature ranges.

The invention provides a control center capable of recognizing when an article storage compartment cannot be accessed by the article extractor due to a frozen shut or jammed displaceable thermal barrier, or a broken or otherwise failed opener. Upon recognizing that a displaceable thermal barrier cannot be opened, the control center prevents the article extractor from attempting to select and extract an article located within the storage compartment that is associated with the failed displaceable thermal barrier and informs the user that articles located in such storage compartment are unavailable for purchase. The control center informs the user that other articles are available for purchase, and upon selection of an available article by the user, the control center directs the article extractor to select and extract the article from a storage compartment whose displaceable thermal barrier can be opened.

The control center also is capable of recognizing when a cooling unit has failed and the temperature inside an individual storage compartment served by the failed cooling unit has risen above a preset temperature range. Upon recognizing a failed cooling unit, the control center prevents the article extractor from selecting and extracting an article located within the storage compartment that is associated with the failed cooling unit and informs the user that articles located in such storage compartment are unavailable for purchase. The control center informs the user that other articles are available for purchase, and upon selection of an available article by the user, the control center directs the article extractor to select and extract the article from a storage compartment whose temperature remains within a preset temperature range.

DETAILED DESCRIPTION OF THE PREFERRED EMBODIMENTS

Figure 1:
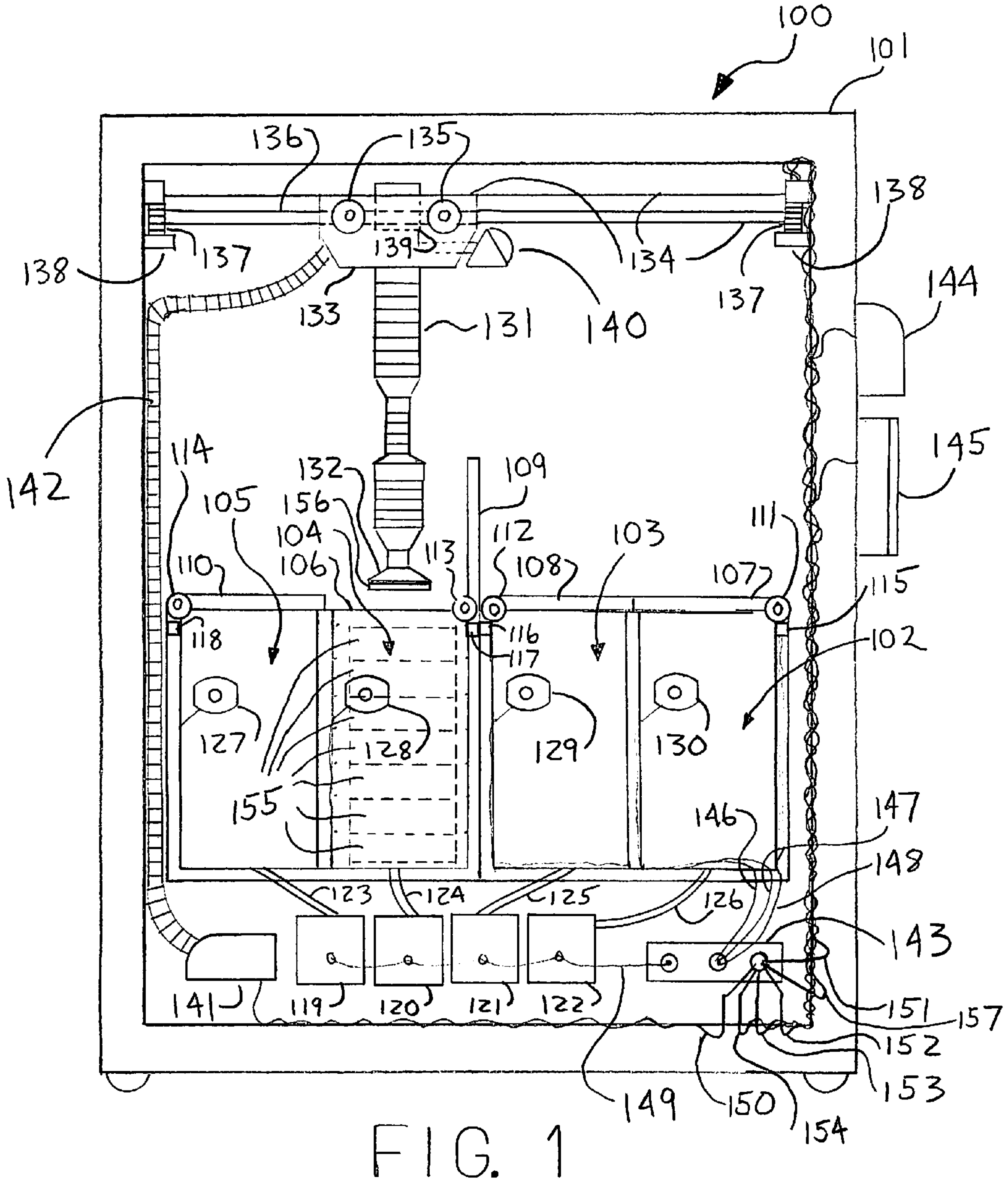
FIG. 1 depicts a front perspective view of an exemplary vending machine constructed in accordance with the principles of the present invention.

FIG. 1 depicts vending machine 100 having outer cabinet 101 with storage compartments 102, 103, 104, and 105 disposed in a lower portion thereof. Storage compartment 102 has an open top that is covered by displaceable thermal barrier 107 (shown in closed position). Storage compartment 103 has an open top covered by displaceable thermal barrier 108 (shown in closed position). Storage compartment 104 has an open top 106 covered by displaceable thermal barrier 109 (shown in open position). Storage compartment 105 has an open top covered by displaceable thermal barrier 110 (shown in closed position). Although four storage compartments are shown in FIG. 1, it should be noted that the invention described herein is not limited to any specific number or arrangement of storage compartments. For example, two storage compartments may be used, or eight storage compartments may be used, and the storage compartments may be of different sizes.

Displaceable thermal barrier 107 is opened by opener 111 and opening sensor 115 senses whether thermal barrier 107 is opened. Displaceable thermal barrier 108 is opened by opener 112 and opening sensor 116 senses whether thermal barrier 108 is opened. Displaceable thermal barrier 109 is opened by opener 113 and opening sensor 117 senses whether thermal barrier 109 is opened. Displaceable thermal barrier 110 is opened by opener 114 and opening sensor 118 senses whether thermal barrier 107 is opened. Opening sensors 115, 116, 117, and 118 are connected to controller 143 by controller-opening sensor connections 147.

Figure 2:
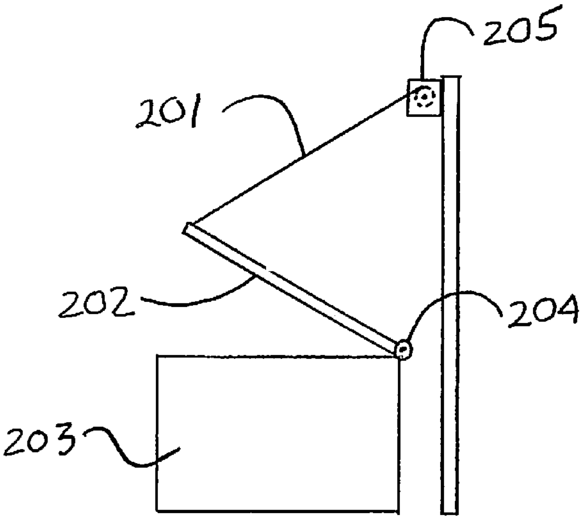
FIG. 2 depicts an alternative embodiment of an opener.
Figure 3:
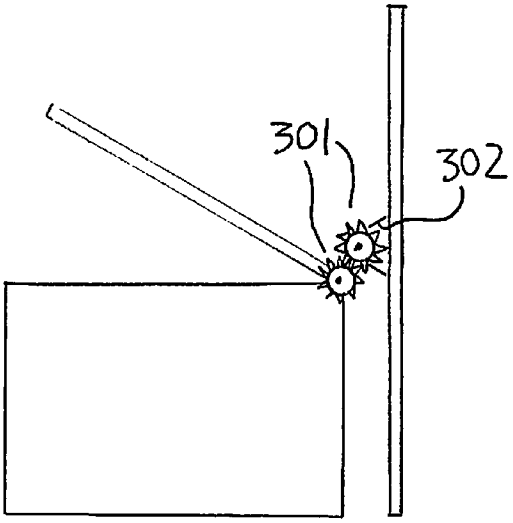
FIG. 3 depicts an alternative embodiment of an opener.
Figure 4:
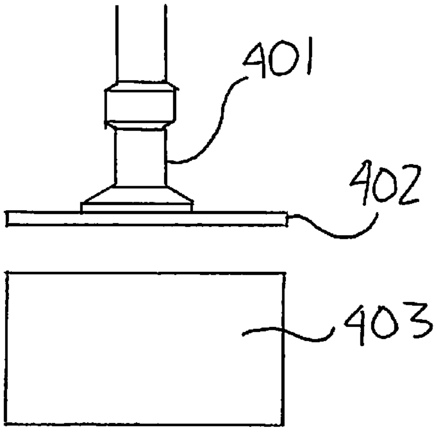
FIG. 4 depicts an alternative embodiment on an opener.

The openers 111, 112, 113, and 114 as shown in FIG. 1 are typical solenoid type openers. Other types of openers are possible. For example, as shown in FIG. 2, the opener may be a cable 201 attached to thermal barrier 202, with thermal barrier 202 attached to storage compartment 203 by hinge 204, and with cable 201 being further attached to motor 205. Alternatively, as shown in FIG. 3, the opener may be a gear system 301 attached to motor 302. Alternatively, the opener may be a ratchet and gear system attached to a motor. In still another alternative, as shown in FIG. 4, the opener may be the article extractor. In this embodiment, the article extractor 401 lifts and separates displaceable thermal barrier 402 from storage compartment 403, places removed displaceable thermal barrier 402 away from storage compartment 403, releases thermal barrier 402, extracts the selected article from storage compartment 403 and vends the selected article, then lifts thermal barrier 402 and places it back over storage compartment 403. If two extractors are used, then one can be used to lift the thermal barrier, and the other can be used to extract the selected article.

Figure 5:
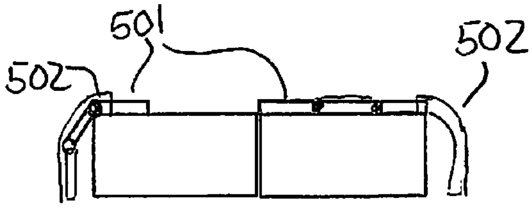
FIG. 5 depicts an alternative embodiment of disposable thermal barriers.
Figure 6:
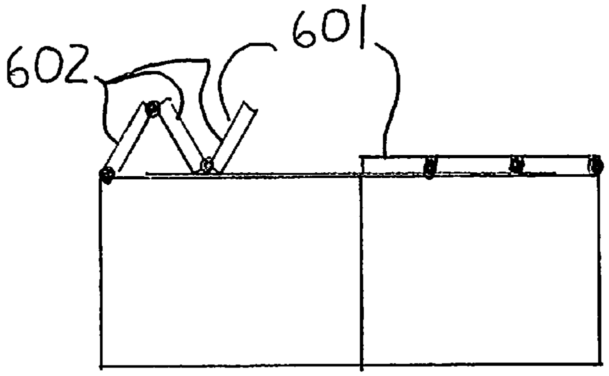
FIG. 6 depicts an alternative embodiment of disposable thermal barriers.
Figure 7:
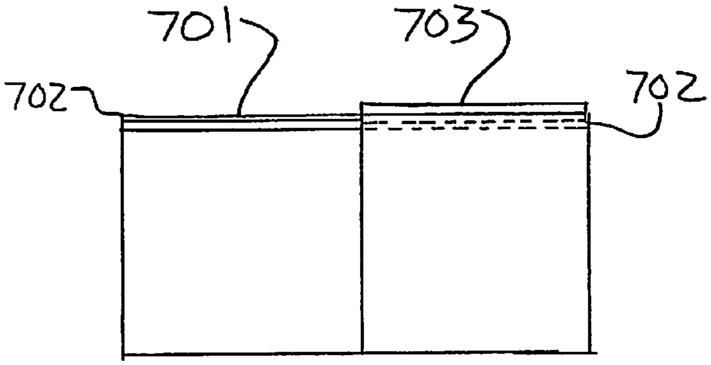
FIG. 7 depicts an alternative embodiment of disposable thermal barriers.

Displaceable thermal barriers 107, 108, 109, and 110 shown in FIG. 1 are opened in an arcing motion as illustrated by displaceable thermal barrier 109 (shown in the open position). Alternatively, the displaceable thermal barriers may be opened in different ways. For example, as shown in FIG. 5, displaceable thermal barriers 501 may be jointed and may slide open along tracks 502. Further, as shown in FIG. 6, displaceable thermal barriers 601 may be separated into segments 602 and folded open. Further, as shown in FIG. 7, displaceable thermal barriers 701 may be opened by sliding on tracks 702 under adjacent displaceable thermal barrier 703. Still further, as shown in FIG. 4, displaceable thermal barrier 402 may be opened by lifting and separating the displaceable thermal barrier from the storage compartment. Each of these alternative embodiments may include different type openers as shown, for example, in FIGS. 1, 2, 3, and 4.

Figure 8:
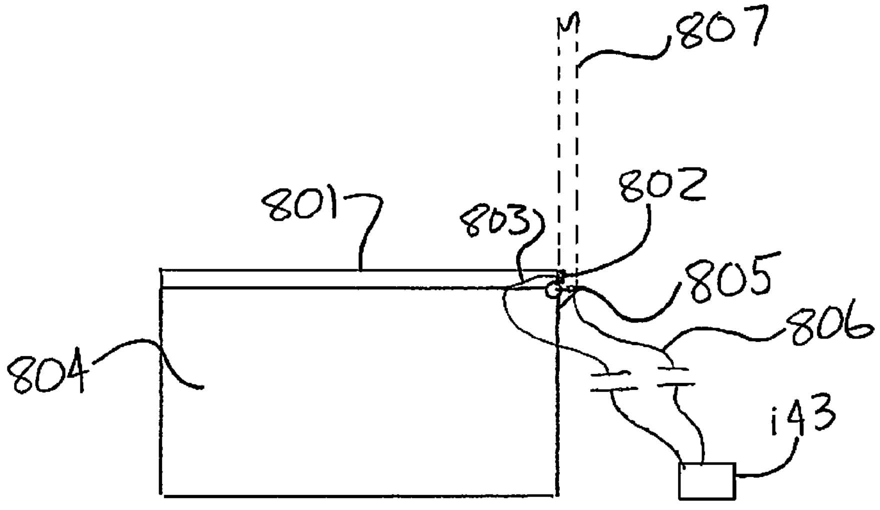
FIG. 8 depicts an opening sensor.

Opening sensors 115, 116, 117, and 118 as shown in FIG. 1 are electrical contact switches as shown in FIG. 8. As shown in FIG. 8, displaceable thermal barrier 801 contains barrier contact plate 802, which may be made of metal or other conductive material. Barrier contact plate is connected to wire 803, which is connected to Controller 143. Storage compartment 804 contains storage compartment contact plate 805, which may be made of metal or other conductive material. Storage compartment contact plate 805 is connected to wire 806, which is connected to Controller 143. In use, when displaceable thermal barrier 802 is in a closed position, there is no contact or electrical conduction between barrier contact plate 803 and storage compartment contact plate 805. When displaceable thermal barrier 802 is in fully opened position 807, there is contact and electrical conduction between barrier contact plate 803 and storage compartment contact plate 805, which completes an electrical circuit and sends an electrical signal through wire 803 or wire 806 to controller 143 that displaceable thermal barrier 802 is in fully opened position 807. Alternatively, the opening sensor may operate in other ways. For example, the electrical contact may be positioned on the end of a sliding thermal barrier. The electrical contact also may be positioned on a folding thermal barrier in such a way as to complete an electrical circuit when the folding thermal barrier is completely opened. Further, the opening sensor need not be electrical in nature, but may be mechanical, photoelectrical, or any combination of these.

Cooling unit 119 is connected to storage compartment 105 by cooling tube 123. Cooling unit 120 is connected is connected to storage compartment 104 by cooling tube 124. Cooling unit 121 is connected is connected to storage compartment 103 by cooling tube 125. Cooling unit 122 is connected is connected to storage compartment 102 by cooling tube 126. Temperature sensor 127 is mounted in or on storage compartment 105 and senses the temperature of storage compartment 105. Temperature sensor 128 is mounted in or on storage compartment 104 and senses the temperature of storage compartment 104. Temperature sensor 129 is mounted in or on storage compartment 103 and senses the temperature of storage compartment 103. Temperature sensor 130 is mounted in or on storage compartment 102 and senses the temperature of storage compartment 102. Temperature sensors 127, 128, 129, and 130 are connected to controller 143 by controller-temperature sensor connection 148, which may be a wire or other electrical, mechanical, or photoelectrical structure capable of transmitting information. In an alternative embodiment, the cooling units can be redundantly connected to the storage compartments, and if one cooling unit fails, a controller can activate alternative connections so that other operative cooling units can be used to cool the storage compartment previously served by the failed cooling unit.

Pressure sensor 156 is connected to article extractor head 132, and article extractor head 132 is connected to article extractor 131. Pressure sensor 156 also is connected by controller-pressure sensor connection 157 to controller 143. Article extractor 131 is connected to vacuum pump 141 by connected vacuum tube 142. Article extractor 131 is connected to article extractor carriage 133, and article extractor carriage 133 is connected to X-Y movement apparatus 134. X-Y movement apparatus includes X gears 135, which are connected to article extractor carriage 133. X gears 135 run on X rail 136. X-Y movement apparatus 134 further includes Y gears 137, which run on Y rails 138. Y rails 138 are connected to outer cabinet 101. X-Y movement apparatus 134 is connected to XYZ transmission 139. XYZ transmission 139 is connected to article extractor 131. Motor 140 is connected to XYZ transmission 139 and provides power for article extractor 131 to telescope up and down along axis Z and for article extractor carriage 133 to move along the X axis and Y axis. Motor 140 is connected to controller 143 by controller-motor connection 152. XYZ transmission 139 is connected to controller 143 by controller-XYZ transmission connection 151.

In the preferred embodiment shown in FIG. 1, the article extractor is of a vacuum type. Alternatively, other types of article extractors may be used to extract the selected article from the storage compartment. For example, the article extractor may include a mechanical claw or scoop, a magnet, some form of adhesive, or a combination of the foregoing. Further, in the preferred embodiment shown in FIG. 1, the article extractor descends into the storage compartment by telescoping. Alternatively, the article extractor may descend into the storage compartment through use of alternative systems such as a cable and pulley system, a scissor system, or a screw system.

Figure 9:
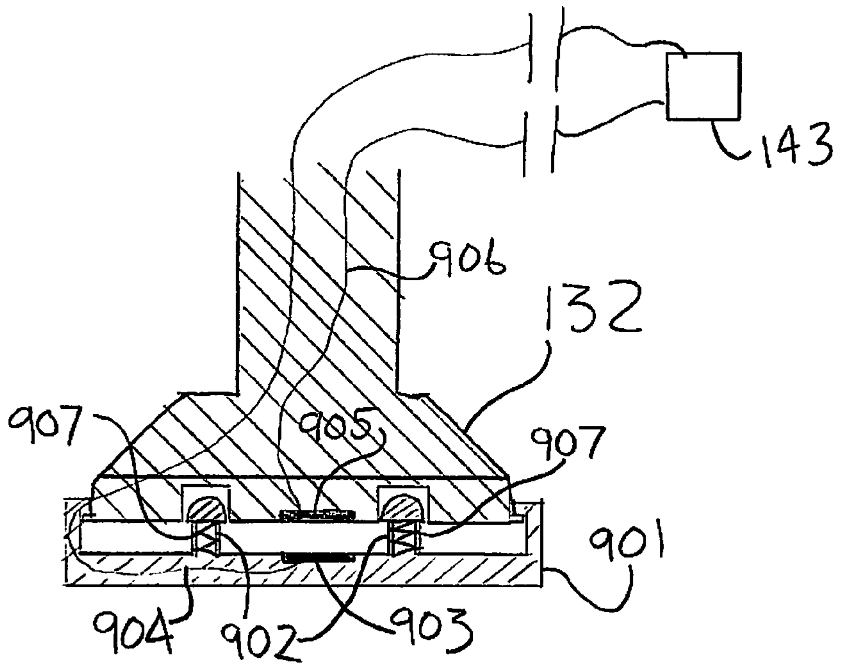
FIG. 9 depicts a contact sensor.

In the preferred embodiment shown in FIG. 1, pressure sensor 156 includes an electrical contact switch as shown in FIG. 9. As shown in FIG. 9, article extractor head 132 and pressure sensor ring 901 are slideably connected by connectors 902. Pressure sensor ring 901 contains pressure sensor ring contact plate 903, which may be made of metal or other conductive material. Pressure sensor ring contact plate 903 is connected to wire 904, which is connected to controller 143. Article extractor head 132 contains article extractor head contact plate 905. Article extractor head contact plate 905 is connected by wire 906 to controller 143. Before the vending cycle begins, there is no contact or electrical conductivity between article extractor head contact plate 905 and pressure sensor ring contact plate 903 due to the biasing influence of compression springs 907.

In use, after pressure sensor ring 901 contacts a selected article, the continued downward force of article extractor head 132 compresses compression springs 906 and there is contact and electrical conduction between article extractor head contact plate 905 and pressure sensor ring contact plate 903, which completes an electrical circuit and sends an electrical signal through wire 904 or wire 906 to controller 143 that the selected article is in contact with article extractor head 132 and pressure sensor ring 901. Alternatively, the pressure sensor may operate in other ways. For example, the sensor for determining whether a selected article is in contact with the article extractor head may be electrical, mechanical, photoelectrical, or any combination of these. Further, the sensor need not measure whether a pressure sensor ring is in contact with the article extractor head. Rather, the sensor may detect whether the selected article is in contact with the article extractor head by other methods, such as by measuring the degree of vacuum pressure within the article extractor head or by using a photoelectric eye.

In the preferred embodiment shown in FIG. 1, article extractor head 132 is moved and positioned above the selected article through use of X-Y movement apparatus 134. Alternatively, other types of movement systems may be used to move and position the article extractor. For example, the article extractor may be moved and positioned by a rotating and telescoping arm, an articulated arm, a scissor system, or by a vectoring system that can move and position the article extractor over a selected article.

Currency receiver 144 is attached to outer cabinet 101 and is connected to controller 143 by controller-currency receiver connection 153. User control panel and display 145 is attached to outer cabinet 101 and is connected to controller 143 by controller-user control panel and display connection 154. The user control and display 145 is capable of providing the user with useful information, such as article selection choices, article prices, article descriptions, availability of articles for purchase, and progress of the vending cycle.

Figure 10:
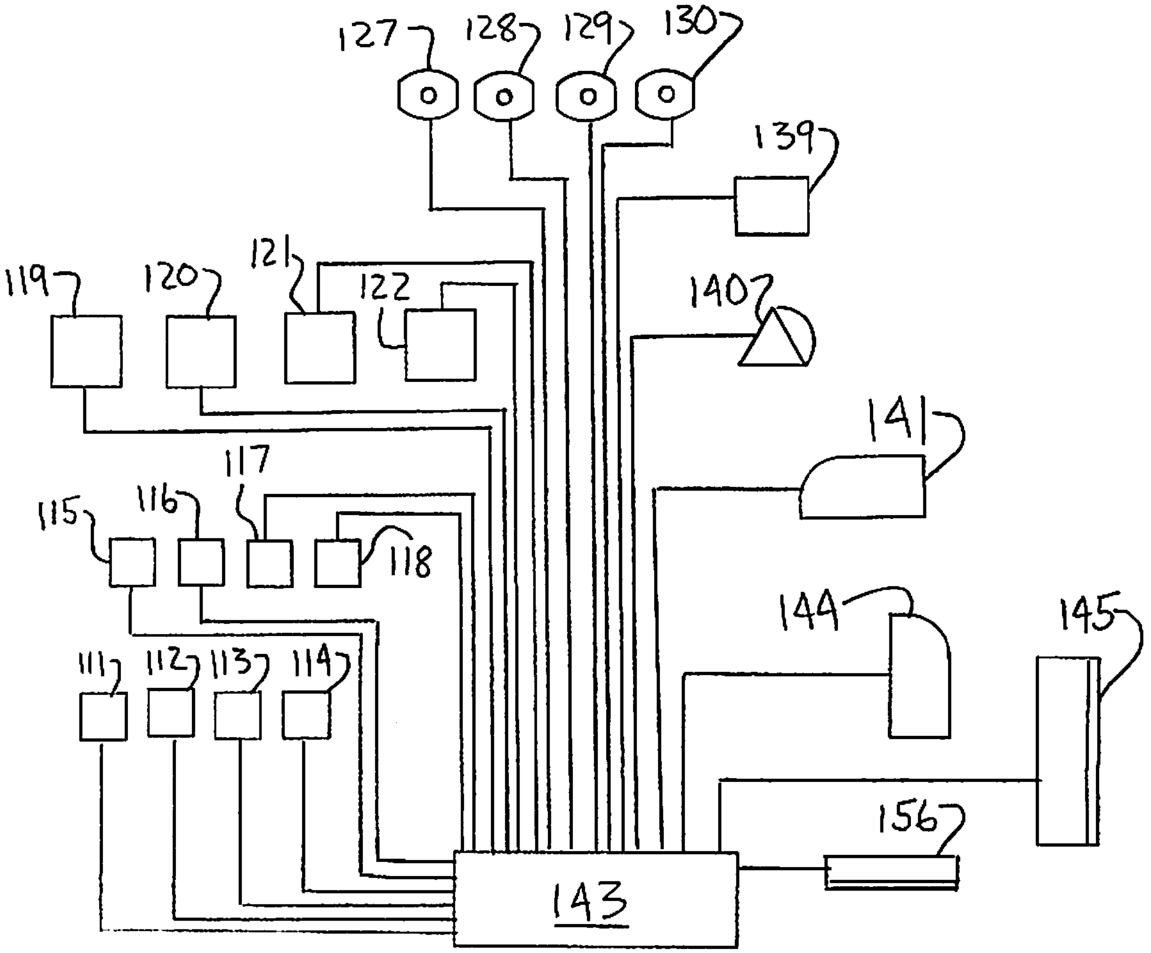
FIG. 10 depicts a wiring diagram.

FIG. 10 shows the connection diagram with regard to controller 143, openers 111, 112, 113, and 114, opening sensors 115, 116, 117, and 118, cooling units 119, 120, 121, and 122, temperature sensors 127, 128, 129, and 130, XYZ transmission 139, motor 140, vacuum pump 141, currency receiver 144, user control panel and display 145, and contact sensor 156, as shown in FIG. 1. Alternatively, any one or more of the openers, opening sensors, cooling units, temperature sensors, XYZ transmission, motor, vacuum pump, currency receiver, user control panel and display, and contact sensor may be connected to the controller through a wireless connection.

In use, a user (not pictured) inserts money into currency receiver 144 and makes a selection from user control panel and display 145, which is connected to controller 143. If the user selects an article stored in cooled storage compartment 104, then controller 143 determines the temperature in cooled storage compartment 104 as monitored by temperature sensor 128. If controller 143 determines that the temperature in cooled storage compartment 104 is within a preset temperature range that is programmed into controller 143, then controller 143 activates opener 113 through controller-opener connection 146. Opener 113 then moves displaceable thermal barrier 109 into the open position as illustrated in FIG. 1. Opening sensor 117 then senses the degree to which displaceable thermal barrier 109 has been opened. If controller 143, which is connected to opening sensor 117 through controller-opening sensor connection 147, determines that displaceable thermal barrier 109 has been opened sufficiently for article extractor 131 to extract a stored article from storage compartment 104, then controller 143 activates the X-Y movement apparatus 134 through motor 140 and XYZ transmission 139 to move article extractor carriage 133 along X rail 136 and Y rails 138 to align article extractor 131 over the article selected by the user. Controller 143 then activates motor 140 and XYZ transmission 139, which lowers article extractor 131 along the Z axis into storage cabinet 104 until article extractor head 132 contacts the article selected by the user. After article extractor head 132 contacts the article selected, contact sensor 156 senses the contact and communicates to controller 143 through controller-contact sensor connection 157 that contact has been made between the article extractor head 132 and the article selected by the user. Controller 143 then activates vacuum pump 110 through controller-vacuum pump connection 150, which creates suction in vacuum tube 142 and on the end of article extractor head 132 in contact with the article selected. The vacuum suction on the article extractor head 132 sucks and holds the article selected against the article selector head 132. Controller 143 then activates motor 140 and XYZ transmission 133, which raise the article extractor and the selected article out of the cooled storage compartment. Controller 143 continues to raise the article extractor head as long as contact sensor 156 indicates that the selected article is in contact with the article extractor head 132. Controller 143 then closes thermal barrier 1109 and returns article extractor 131 to its original position over the dispenser tray (not shown) through the activation of X-Y movement apparatus 134. Controller 143 then deactivates vacuum pump 141, which releases the selected article from article extractor head 132 into a dispensing tray for retrieval by the user.

The structure and operation of the X-Y movement apparatus 134 for positioning the article extractor 131 along X-Y rails above the selected article and use of the XYZ transmission 139 and motor 140 to lower and raise the article extractor 131 along the Z axis as described above should be well appreciated by persons in the vending machine art. Further, the use of a vacuum pump 141 to create a vacuum suction in an article extractor should be well appreciated by persons in the vending machine art. Still further, the use of a pressure sensor 156 to sense whether an article has contacted and remained in contact with an article extractor head should be well appreciated by persons in the vending machine art. Additionally, the use of cooling units to cool storage compartments to temperatures including without limitation −40 degrees Celsius should be well appreciated by persons in the vending machine art. Therefore, no further descriptions are deemed necessary for an adequate understanding of the basic structure and operation of these aspects of the vending machine of the present invention.

If controller 143 determines that the temperature in cooled storage compartment 102 is not within the preset temperature range programmed into controller 102, then controller 143 does not activate opener 111 to open displaceable thermal barrier 107 and does not activate the X-Y movement apparatus 134 to align article extractor 131 over an article in storage compartment 102. Further, if controller 143 determines from opening sensor 115 that displaceable thermal barrier 107 has not been sufficiently opened by opener 111 to extract a selected article from storage compartment 102, then controller 143 does not activate the X-Y movement apparatus 134 to align article extractor 131 over an article in storage compartment 102.

In a preferred embodiment, if controller 143 determines that the temperature in cooled storage compartment 102 is not within the preset temperature range programmed into controller 143 and/or that displaceable thermal barrier 107 is incapable of being opened by opener 111, control center 143 determines whether the article selected by the user is available in another cooled storage compartment. If controller 143 determines that the selected article is available in another cooled storage compartment, for example in storage compartment 103, then controller 143 determines whether the temperature in storage compartment 103 is within the preset temperature range programmed into controller 143. If the article selected by the user is not available in any of the other cooled storage compartments, control center 143 alerts the user that the selected article is not available. If the article selected by the user is available in another cooled storage compartment, for example in cooled storage compartment 103, and if the temperature in cooled storage compartment 103 is within the preset temperature range, controller 143 then opens displaceable thermal barrier 108 and activates the X-Y movement apparatus 134, motor, 140, and XYZ transmission 139 to move article extractor 131 to select, extract, and dispense the article selected by the user in the manner previously described.

If controller 143 determines that the temperature in another cooled storage compartment, for example storage compartment 103, is not within the preset temperature range programmed into controller 143, then control center 143 does not open displaceable thermal barrier 108 and does not activate the X-Y movement apparatus 134 to move article extractor 131 along rails in the X and Y directions to align article extractor 131 over an article in storage compartment 103. Further, if controller 143 determines from opening sensor 116 that displaceable thermal barrier 108 has not been opened, controller 143 does not activate the X-Y movement apparatus to move article extractor 131 along rails in the X and Y directions to align the article extractor 131 over an article in storage compartment 103.

Figure 11:
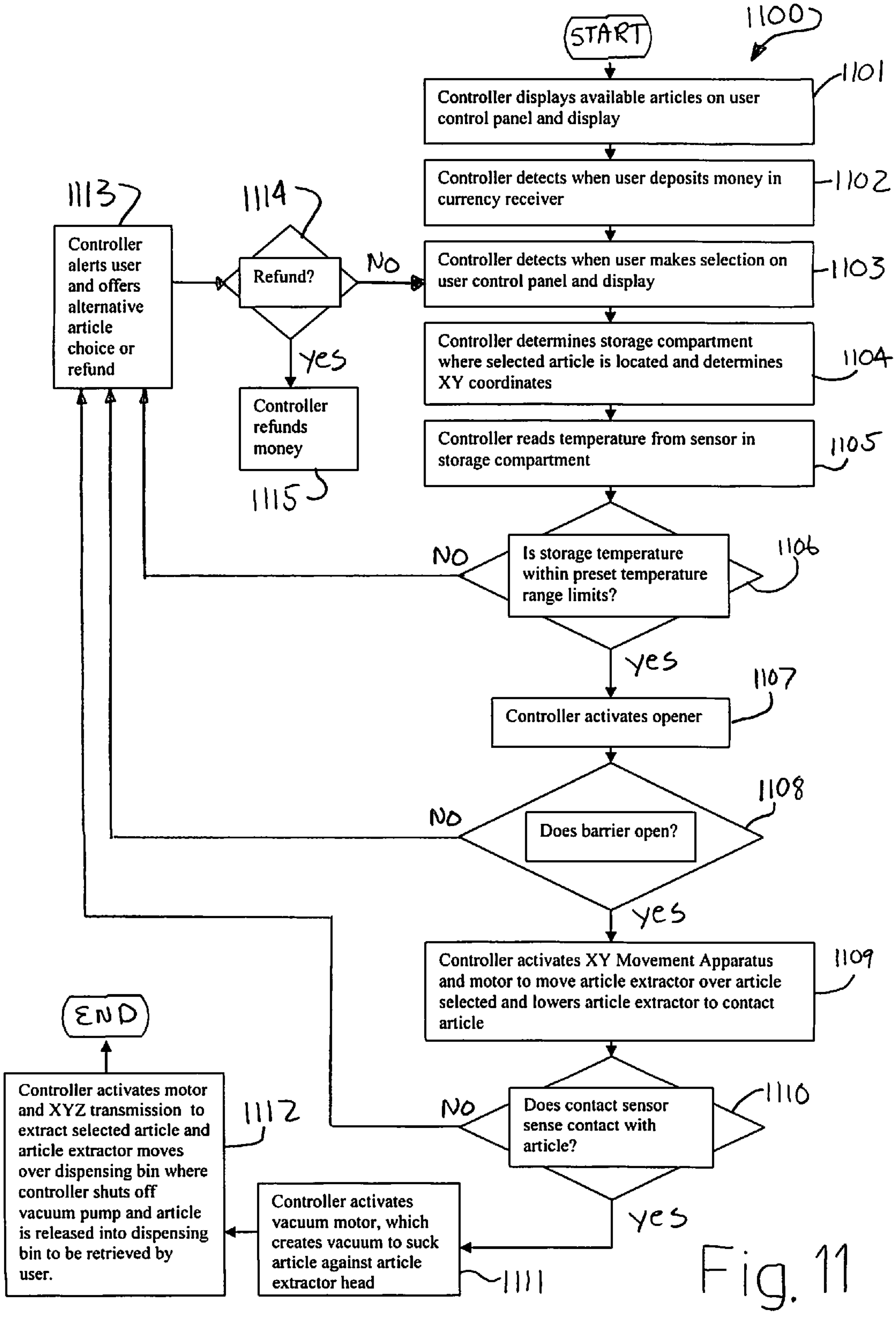
FIG. 11 depicts a flowchart of controller operation.

The operations of controller 143 as depicted in FIG. 1 with regard to displaying available product, detecting temperatures of the cooled storage cabinets, opening of the displaceable thermal barriers, sensing contact between the article extractor and the selected article, and warning of the users, is further described in the diagram shown in FIG. 11. As shown in FIG. 11, at the start of controller operation 1100, controller 143 displays available articles on user control panel and display 145 (1101). Controller 143 detects when the user deposits adequate money in currency receiver 144 (1102). Controller 143 then detects when the user makes a selection on the user control panel and display 145 (1103). Controller 143 then determines the storage compartment where the selected article is located and determines the XY coordinates of the selected article (1104). Controller 143 then reads the temperature from the appropriate temperature sensor 127, 128, 129, or 130 in the storage compartment where the selected article is located (1105). Controller 143 then determines whether the temperature in the storage compartment is within preset temperature range limits that have been programmed into controller 143 (1106). If the answer is yes in step (1106), then controller 143 activates the appropriate opener 111, 112, 113, or 114 (1107). Controller 143 then determines whether the appropriate thermal barrier 107, 108, 109, or 110 opened (1108). If the answer is yes in step (1108), then controller 143 activates the XY movement apparatus 134 including the XYZ transmission 139 and motor 140 to move article extractor 131 over selected article and lowers article extractor 131 to contact selected article (1109). Controller 143 then determines whether the contact sensor 156 senses contact with the selected article (1110). If the answer is yes is step (1110), then controller 143 activates the vacuum pump 141, which creates vacuum to suck the selected article against the contact sensor 156 and article extractor head 132 (1111). Controller 143 then activates motor 140 and XYZ transmission 139 to extract the selected article from the storage compartment and move the article extractor 131 over the dispensing bin where the controller 143 shuts off the vacuum pump 141, which releases the selected article into the dispensing bin to be retrieved by the user (1112), thereby ending the vending cycle. If the answer is no in steps (1106), (1108), or (1110), then controller 143 alerts the user and offers an alternative article choice or refund (1113). The controller 143 determines whether the user wants a refund (1114). If the answer is yes to (1114), the controller 143 activates the currency receiver 144 to provide a refund to the customer (1115). If the answer is no to (1114), then controller 143 detects when user makes a selection on the user control panel and display 145 (1103), and the control operations and vending cycle as described above continues.

It should be noted that controller 143 is not limited to operations 1100 as described in FIG. 11. The controller is capable of receiving and processing additional data and information and other operations can be programmed into the controller. For example, the controller is capable of holding and processing information concerning the identity, description, ingredients, and expiration date of the articles vended and where the articles are stored in the XY coordinate grid in the vending machine. If the controller detects that the temperature range in a storage compartment is outside the preset range, the controller can determine whether the selected article is in another storage compartment, check the temperature of the storage compartment, and vend the article without providing the user a warning. If the cooling units are redundantly connected to the storage compartments, the controller can open and close cooling tubes as appropriate to cool a storage compartment whose primary cooling unit has failed.

Storage compartments 102, 103, 104, and 105 as shown in FIG. 1 may be kept at a frozen temperature to store frozen free flowing beads of ice cream. Alternatively, storage compartments 102, 103, 104, and 105 may be kept at different temperatures, e.g., two frozen and two cooled, so that different articles may be stored and vended. For example, storage compartments 102 and 103 may be kept at a freezing temperature to store frozen free flowing beads of ice cream and storage compartments 104 and 105 may be kept at a refrigerated temperature above freezing to store drinks such as soft drinks and bottled water. Alternatively, one or more storage compartments may be kept at ambient air temperature to vend items such as potato chips and candy. In such a case, the thermal barrier can serve as a barrier to prevent dust and other foreign objects and material from entering the storage compartment.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A vending machine apparatus comprising:

a housing defining an internal cavity;

a plurality of article storage compartments positioned inside the internal cavity, each article storage compartment having an article passage opening in one side of the article storage compartment for allowing removal of articles stored inside the compartment;

a cooling unit having a cold generating portion in thermal contact with one or more inside walls of the article storage compartments for cooling the inside of the article storage compartments;

a plurality of displaceable thermal barriers, each displaceable thermal barrier positioned over an article passage opening so as to thermally separate the interior of the article storage compartment from the remainder of the interior of the internal cavity;

an opener for opening and closing each displaceable thermal barrier independently from each other displaceable thermal barrier;

an opening sensor to detect whether each thermal barrier has been opened by the opener;

an article extractor for selectively removing an article from an article storage compartment; and a controller for automatically controlling the vacuum lift and automatically controlling the openers in response to a user's selection.

2. A vending machine apparatus in accordance with claim 1, further comprising a controller that recognizes from the opening sensor when a thermal barrier has not been opened and that prevents the article extractor from attempting to select and extract an article from a storage compartment whose thermal barrier has not been opened.

3. A vending machine apparatus in accordance with claim 2, wherein each of said article storage compartments further has a temperature sensor.

4. A vending machine apparatus in accordance with claim 3, wherein said controller recognizes from the temperature sensor when the temperature in a storage compartment has fallen outside of a preset temperature range and prevents user selection and removal of an article contained within such storage compartment.

5. A vending machine apparatus in accordance with claim 1, wherein each of said article storage compartments further has a temperature sensor.

6. A vending machine apparatus in accordance with claim 5, wherein said controller recognizes from the temperature sensor when the temperature in a storage compartment has fallen outside of preset temperature range and prevents user selection and removal of an article contained within such storage compartment.

7. A vending machine apparatus, n accordance with claim 1, wherein each article storage compartment has an independent cooling unit having a cold generating portion in thermal contact with one or more inside walls of the article storage compartment for cooling the inside of the article storage compartment.

8. A vending machine apparatus in accordance with claim 7, wherein each of said article storage compartments further has a temperature sensor.

9. A vending machine apparatus in accordance with claim 8, further comprising a controller that recognizes from the temperature sensor when the temperature in a storage compartment has fallen outside of a preset temperature range and prevents user selection and removal of an article contained within such storage compartment.

10. A vending machine apparatus in accordance with claim 9, wherein each displaceable thermal barrier has an opening sensor to detect whether the thermal barrier has been opened by the opener.

11. A vending machine apparatus in accordance with claim 10, wherein the controller further recognizes from the opening sensor when a thermal barrier has not been opened and that prevents the article extractor from attempting to select and extract an article from a storage compartment whose thermal barrier has not been opened.

12. A vending machine apparatus in accordance with claim 7, wherein each displaceable thermal barrier has an opening sensor to detect whether the thermal barrier has been opened by the opener.

13. A vending machine apparatus in accordance with claim 12, wherein the controller further recognizes from the opening sensor when a thermal barrier has not been opened and that prevents the article extractor from attempting to select and extract an article from a storage compartment whose thermal barrier has not been opened.

14. A vending machine apparatus in accordance with claim 9, wherein said controller individually controls the temperatures in the storage compartments by controlling the cooling units.

15. A method of vending articles comprising:

moving an article extractor, in a housing over a plurality of storage compartments covered by displaceable thermal barriers, each of which thermal barriers is capable of being opened independently from each other displaceable thermal barrier and each of which thermal barriers has an opening sensor to detect whether each thermal barrier has been opened by the opener;

opening a displaceable thermal barrier on one storage compartment independently from each other displaceable thermal barrier;

extracting an article from the storage compartment having an opened thermal barrier;

closing the thermal barrier; and dispensing the article extracted from the housing.

16. The method of vending articles of claim 15, further comprising:

determining whether the displaceable thermal barrier is opened before attempting to extract an article from the storage compartment.

17. The method of vending articles of claim 15, further comprising:

cooling the storage compartments with individual cooling units.

18. The method of vending articles of claim 17, further comprising:

determining whether the temperature in a storage compartment is within a preset temperature range before attempting to extract an article from such storage compartment.

19. A vending machine apparatus comprising:

a housing defining an internal cavity;

a plurality of article storage compartments positioned inside the internal cavity, each article storage compartment having an article passage opening in one side of the article storage compartment for allowing removal of articles stored inside the compartment;

an independent cooling unit for each storage compartment, each cooling unit having a cold generating portion in thermal contact with one or more inside walls of the article storage compartments for cooling the inside of the article storage compartments;

a plurality of displaceable thermal barriers, each displaceable thermal barrier positioned over an article passage opening so as to thermally separate the interior of the article storage compartment from the remainder of the interior of the internal cavity;

an opener for opening and closing each displaceable thermal barrier independently from each other displaceable thermal barrier;

an article extractor for selectively removing an article from an article storage compartment;

an opening sensor to detect whether a thermal barrier has been opened by the opener;

a temperature sensor to detect the temperature in each storage compartment;

a controller for automatically controlling the article extractor and automatically controlling the openers in response to a user's selection;

a controller that recognizes from the opening sensor when a thermal barrier has not been opened and that prevents the article extractor from attempting to extract an article from a storage compartment whose thermal barrier has not been opened;

a controller that recognizes from the temperature sensor when the temperature in a storage compartment has fallen outside of a preset temperature range and prevents user selection and extraction of an article contained within such storage compartment; and a controller that individually controls the temperatures in the storage compartments by receiving temperature information from the temperature sensors and controlling the cooling units.

* * * * *